United States Patent [19]

Ellerbrok

[11] Patent Number: 5,375,878
[45] Date of Patent: Dec. 27, 1994

[54] GAS BAG FOR A VEHICLE OCCUPANT RESTRAINING SYSTEM AND FABRIC FOR ITS PRODUCTION

[75] Inventor: Norbert Ellerbrok, Alfdorf, Germany

[73] Assignee: TRW Repa GmbH, Alfdorf, Germany

[21] Appl. No.: 156,248

[22] Filed: Nov. 22, 1993

[30] Foreign Application Priority Data

Nov. 27, 1992 [DE] Germany .............................. 4239978
Aug. 17, 1993 [DE] Germany .............................. 4327649

[51] Int. Cl.$^5$ ...................... B60R 21/16; D03D 1/02
[52] U.S. Cl. ..................... 280/743 R; 280/728 R; 139/35
[58] Field of Search ....................... 280/743 R, 728 R; 139/35

[56] References Cited

U.S. PATENT DOCUMENTS

| 3,892,425 | 7/1975 | Sakairi et al. | 280/743 R |
| 4,963,412 | 10/1990 | Kokeguchi | 280/743 R |
| 5,131,434 | 7/1992 | Krummheuer et al. | 280/743 R |
| 5,178,408 | 1/1993 | Barrenseneen et al. | 280/728 R |
| 5,208,097 | 5/1993 | Honma et al. | 280/743 R |

FOREIGN PATENT DOCUMENTS

| 0509399 | 10/1992 | European Pat. Off. . |
| 2122704 | 11/1971 | Germany . |
| 3644554 | 4/1988 | Germany . |
| 4004216 | 8/1991 | Germany . |
| 4009611 | 10/1991 | Germany . |
| 4026374 | 10/1991 | Germany . |
| 4039811 | 6/1992 | Germany . |

*Primary Examiner*—Kenneth R. Rice
*Attorney, Agent, or Firm*—Tarolli, Sundheim & Covell

[57] ABSTRACT

A gas bag for vehicule occupant restraining systems comprises an envelope of several fabric sections, the gas permeability of which differs, despite which all fabric sections of the envelope can be fabricated of textile material having the same consistency, particularly having the same thread density (set) when the gas permeability of the fabric is defined with due regard to the tension condition between warp and weft threads of the inflated gas bag and taking into account the dynamic behaviour of the gas permeability as a function of the weave and crimp. Fabric sections having the same consistency can be stitched with no problem in series production and the seams are of high structural strength.

10 Claims, 5 Drawing Sheets

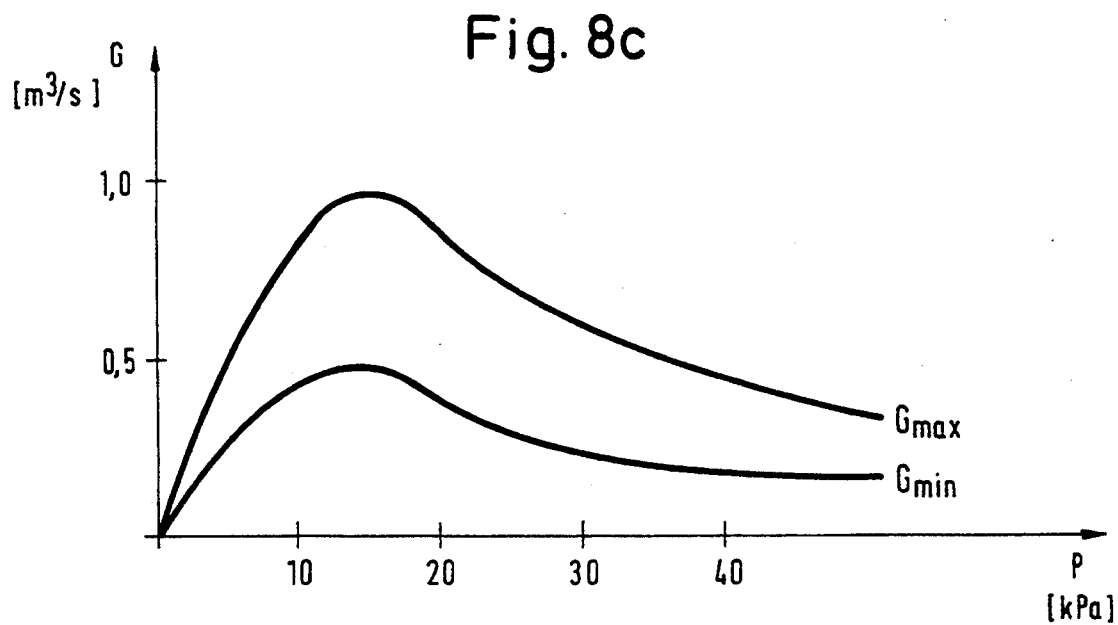

GAS BAG FOR A VEHICLE OCCUPANT RESTRAINING SYSTEM AND FABRIC FOR ITS PRODUCTION

The invention relates to a gas bag for a vehicle occupant restraining system having an envelope of uncoated fabric. The invention further relates to a fabric for the production of the gas bag.

To avoid difficulties involved in conventional gas bag designs and due to the use of polyamide fabrics coated on the inside with butyl rubber, uncoated textile fabrics are used to fabricate gas bags according to the proposal in EP O 454 213 A1. The necessary 10w gas permeability of the fabric may be achieved by consolidating the fabric, particularly by shrinking, thermofixing and calandering. By using low-shrinkage threads in the lower part of the gas bag and high-shrinkage threads in the upper part of the gas bag it can be achieved that after the gas bag has been inflated, the gas permeability of the gas bag lower part is greater than that of the gas bag upper part so that a defined outflow of the gas from the gas bag results from impact of the vehicle occupant therewith. Experience has shown, however, that the gas permeability of an uncoated fabric is subject to very high fluctuations in series production. For this reason the fabric parts of the gas bag, required to exhibit gas permeability values differing from each other, must be fabricated of differing types of fabric, particularly fabric types having different filament densities and types of filament yarn of differing shrinkage. Using differing fabric types to fabricate a gas bag is, however, problematic since seams connecting differing types of fabric have a reduced design strength and are difficult to fabricate in series production.

The present invention provides a gas bag from uncoated fabric material having consistent gas permeability values, wherein one and the same fabric type can be used for fabric parts having differing gas permeability values, particularly a textile fabric material having at least more or less the same filament density and consisting of at least more or less the same filament yarn. The invention is based on the knowledge that the gas permeability of a fabric depends to a high degree on how high the tensions occurring in the inflated gas bag are, on the one hand, in the direction of the warp threads and, on the other, in the direction of the weft threads. For one thing there exists a strong dependency of the gas permeability on the absolute value of the tension in one or other direction; and for another, there also exists a marked dependency of the gas permeability on the ratio of the tension in the direction of the warp threads with respect to the tension in the direction of the weft threads. On the basis of this knowledge it is proposed according to the invention for each fabric material from which the fabric parts of the gas bag are fabricated, to establish the gas permeability as a function of the various values of the ratio of the tension in the direction of the warp threads with respect to the tension in the direction of the weft threads. Prior art requires the gas permeability of a gas bag fabric to be measured at a constant pressure difference of 500 Pa. The invention is further based on the knowledge that uncoated gas bag fabrics may exhibit, under dynamic conditions similar to those of the case in which the gas bag restraining system is activated, a gas permeability which strongly deviates from the values anticipated on the basis of the measurement made at a constant difference in pressure. This is why, in determining the gas permeability of the gas bag fabric, preferably the dynamic conditions predominant in activation of a gas bag restraining system are simulated. Depending on the tension distribution in the individual fabric parts caused by the shape of the inflated gas bag the orientation of the warp and weft threads of the fabric parts of the inflated gas bag is selected so that the predefined gas permeability is set for each fabric part at the differential pressure profile anticipated in practice. Using one and the same type of fabric, different areas of the gas bag can then be endowed with highly consistent gas permeability values with good repeatability and which differ from each other in different areas.

The tension distribution in an inflated gas bag depends on its geometry. In the one extreme case of a globular shaped gas bag when inflated, the tension ratio between the warp and weft threads is 1 to 1, due to the tension distribution being uniform. The orientation of the warp and weft threads on the bag can thus be any. Setting the gas permeability for the various fabric parts is achieved by carefully selecting the weave of the fabric for at least roughly the same set, or filament density, and more or less the same filament yarn of the type of fabric used. Experience has shown namely that for a given type of fabric and for given values of the tension in the direction of the warp threads and in the direction of the weft threads, the gas permeability may be influenced to a high degree and with good repeatability by the nature of the weave. The dependencies of the gas permeability on the tension in the direction of the warp threads and on the tension in the direction of the weft threads are determined systematically by the weaving parameters and by the finishing parameters for the various kinds of weave involved.

In the opposite extreme case of a gas bag inflated to form a cylinder the tension ratio in the envelope part is 2 to 1 between the circumferential direction and the axial direction and 1 to 1 in the end parts. In this case too, all parts of the gas bag can be made from the same textile material. As long as the gas permeability of the end parts is required to be substantially higher than that of the envelope part either the warp threads or the weft threads of the envelope part are oriented in the circumferential direction of the inflated gas bag, whereas in the end parts the orientation of the warp and weft threads can be any, since here the tension ratio is 1 to 1. Selecting the fabric material and the orientation of the warp and weft threads in the envelope part is done on the basis of a graph plotting the gas permeability as a function of the tension for various conditions thereof in the direction of the warp threads in relation to the tension in the direction of the weft threads.

According to one particularly advantageous further embodiment of the invention at least one part of the filament yarn used to produce the fabric material consists of hollow fibers. By using hollow fibers the dependency of the gas permeability of the fabric on the tension ratios can be influenced to a high degree. Hollow fibers can be flattened to a greater degree under pressure than fibers of solid material. Flattening the filament yarn under the effects of pressure is, however, one of the causes for the gas permeability changing with tension in the direction of the warp or weft threads. A fabric, the filament yarn of which is made up—at least in part—of hollow fibers, can be adapted in its gas permeability behaviour to the most different of employment conditions by varying the weave, so that despite using one and the same type of fabric, greatly differing gas permeability characteristics can be achieved.

Further features and benefits to be had from the invention will now be described in the following with reference to the drawing in which:

FIG. 8c is a graph showing the total gas permeability of an ideal gas bag under dynamic conditions.

Figure 1A:
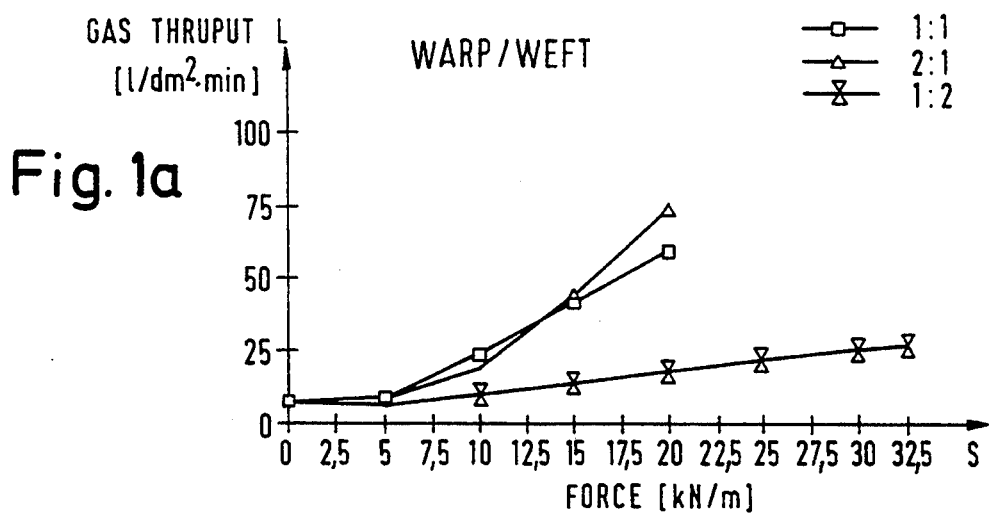
FIGS. 1a, 1b and 1c are graphs showing the gas permeability as a function of the tension for various conditions of tension in the direction of the warp threads in relation to the tension in the direction of the weft threads for various textile fabrics having more or less the same density and comprising the same or roughly the same filament yarn.
Figure 1B:
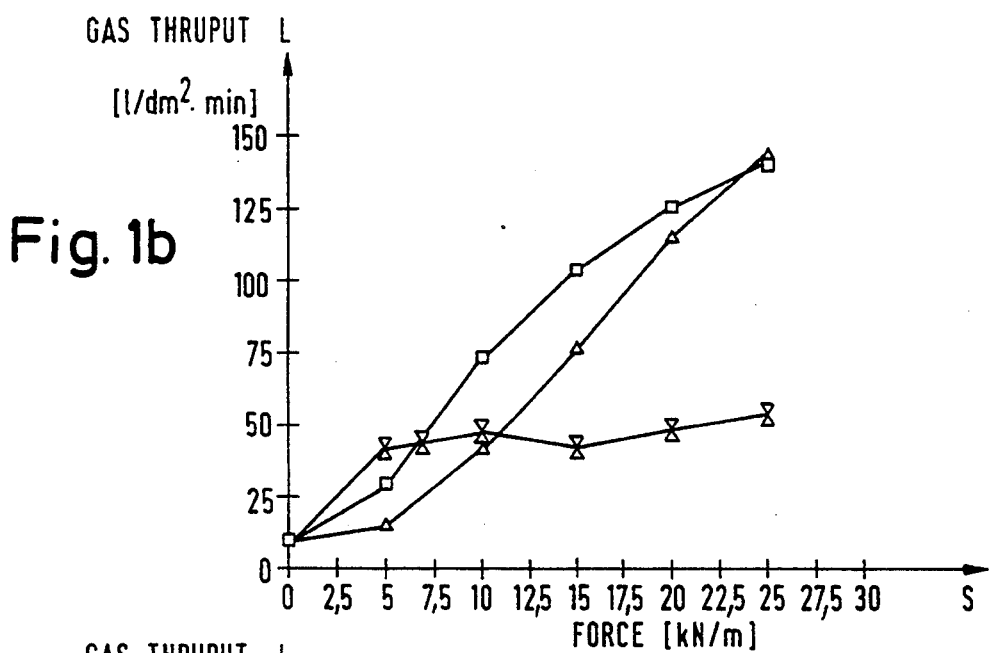

The graphs in FIGS. 1a and 1b show the results of systematic investigations on two specimens of fabric, both of which are uncoated and fabricated from the same type of filament yarn, but which differ in the weave.

In the graphs of FIGS. 1a and 1b the gas permeability L is plotted for a difference in pressure of 500 Pa as a function of the tensile force S exerted on the fabric for three different parameters, namely for three different values of the ratio of the tension in the direction of the warp threads in relation to the tension in the direction of the weft threads. It will be appreciated that the gas permeability depends to a high degree on this ratio and in particular that the increase in gas permeability L greatly differs for various values of the tension ratio with increasing tensile force S. In testing the first fabric specimen (FIG. 1a) the gas permeability increases only slightly for a tension ratio of 1 to 2 and still remains below a value of roughly 30 $l/dm^2 \cdot min$ for a tensile force exceeding 30 kN/m, where tension ratio of 1 to 1 the gas permeability L already attains a value of approx. 60 $l/dm^2 \cdot min$ for a force of approx. 20 kN/m. The gas permeability increases all the more when the tension in the direction of the warp threads is twice that of the tension in the direction of the weft threads. All in all, however, the gas permeability is relatively low for this fabric specimen.

The second fabric specimen (FIG. 1b) shows for tension ratios of 1 to 1 and 2 to 1 a substantially higher gas permeability, the values of which exceed by far 100 $l/dm^2 \cdot min$. By contrast, the gas permeability hardly increases to a value of more than approx. 50 $l/dm^2 \cdot min$ for a tension ratio of 1 to 2.

It can already be seen from FIG. 1b that the curve representing the gas permeability must not necessarily increase continuously; by a suitable selection of the weave and crimp the shape of the curve can be adjusted so that the gas permeability for mean values of the tensile force S, i.e. approx. 10 kN/m achieves a maximum value before being subsequently reduced. This effect can be made use of to adapt the hardness of the gas bag to the force of impact. At a high internal pressure of the gas bag, corresponding to a large mass of the vehicle occupant to be protected or to a severe impact, the hardness of the gas bag is continuously increased; for a low internal pressure the gas is discharged more quickly, so that the bag is quite soft. The fabric of which the gas bag is made thus acts as a control element by means of which the hardness of the gas bag can be optimally adapted to the prevailing conditions.

Figure 1C:
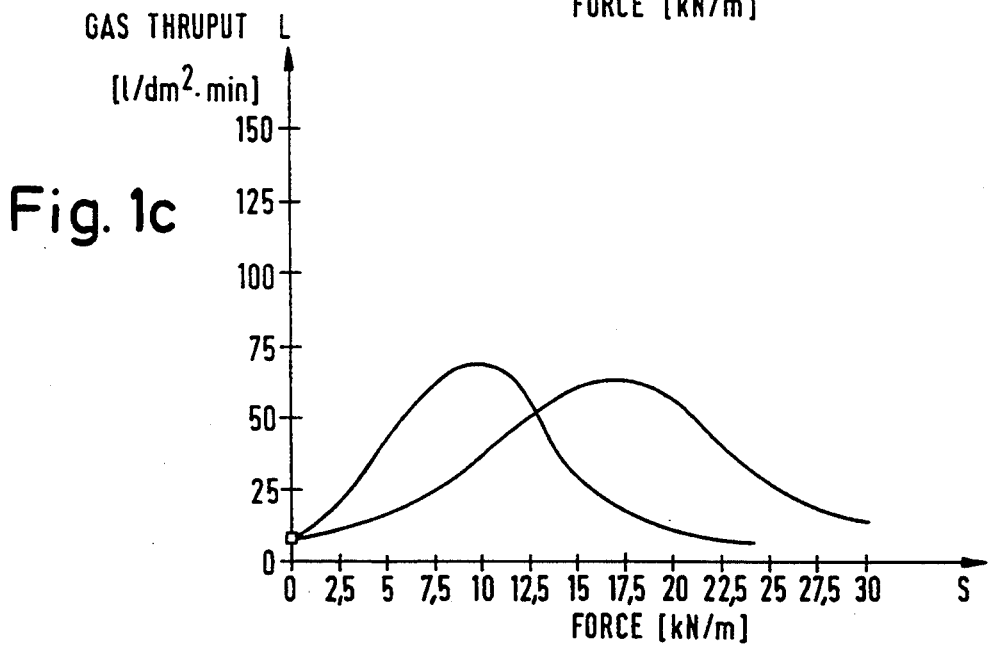

In the graph of FIG. 1c two curves representing the gas permeability as a function of the tensile force are shown, with which an even more pronounced regulating function of the gas bag can be achieved using the same principles. For a given density and a given type of filament yarn the desired shape of the curve can be adjusted by selecting the weave and the crimp of warp and weft.

Figure 2A:
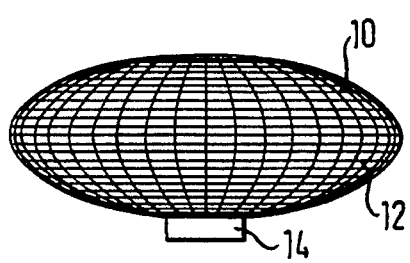
FIGS. 2a and 2b show a gas bag inflated to be more or less balloon-shaped in the side view and in a view as seen from the gas generator side.
Figure 2B:
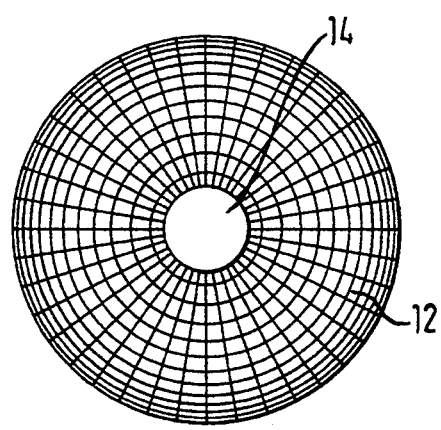

The gas bag shown in FIGS. 2a and 2b has generally the shape of a balloon when inflated and comprises an upper part 10 and a lower part 12 which includes a central opening for the connection to a gas generator 14. When the gas bag has such a balloon shape the tension distribution in the gas bag is substantially uniform. The warp and weft orientation can thus be any for the fabric parts used for the upper part 10 and the lower part 12. It is necessary that the upper part 10 facing the vehicle occupant has a low gas permeability to avoid injury of the vehicle occupant due to particles and hot gases. For this purpose the gas permeability of the lower part 12 should be at least twice that of the upper part 10. For an easy series manufacture of the gas bag it is important that the fabric parts of which the upper part 10 and the lower part 12 are made, have more or less the same quality and particularly at least roughly the same density and filament type. The fabric parts are stitched together at their outer edges. Due to both fabric parts having the same density and filament type the seam is easy to produce and of high structural strength.

Due to the balloon shape of the gas bag as shown in FIGS. 2a and 2b, the curve according to the FIGS. 2a and 2b is the determining factor for the 1 to 1 tension ratio. For the upper part the textile material of the first fabric specimen (FIG. 1a) is selected, the gas permeability of which is between 5 and 60 $l/dm^2 \cdot min$, for a tension range of 5 to 20 kN/m. For the lower part 12 a textile material is used according to that of the second fabric specimen (FIG. 1b), the gas permeability of which is between approx. 27 and 125 $l/dm^2 \cdot min$ for the tension ratio of 1 to 1 and a t ranging from 5 to 20 kN/m. Within the whole range of tensions relevant to practical conditions, the gas permeability of the lower part 12 is thus more than twice that of the upper part 10.

Figure 3:
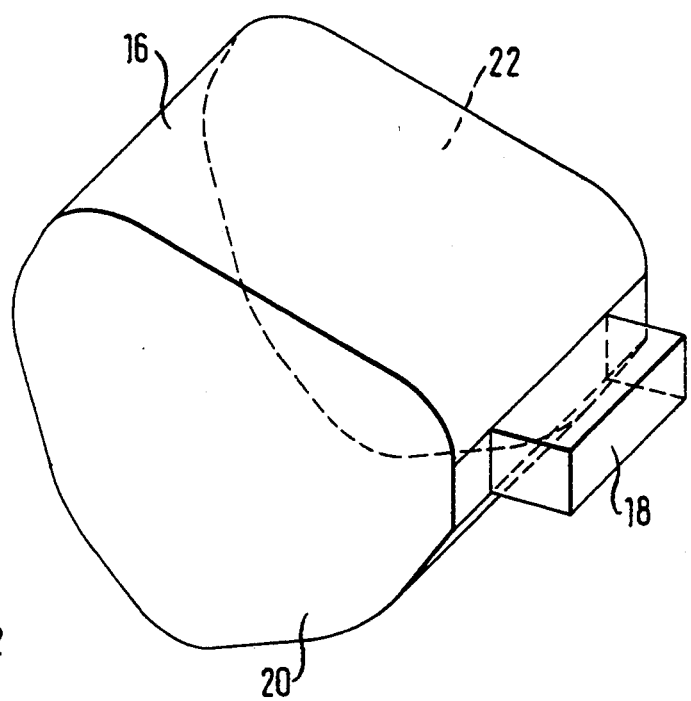
FIG. 3 is a schematic perspective view of a gas bag inflated to be more or less cylindrical in shape.

FIG. 3 shows a gas bag which is generally cylindrical in shape when inflated, designed for a gas bag restraining system at the front passenger's location. The gas bag comprises an envelope part 16, on which the connection for a rectangular gas generator 18 is formed, and two end parts 20, 22. Due to the cylindrical shape of the gas bag, the tension in the circumferential direction of the envelope part 16 is twice as high as in the axial direction, whereas in the end parts 20, 22 the tension distribution is uniform. The envelope part 16 facing the vehicle occupant is required to exhibit a substantially less gas permeability than the two end parts 20, 22 so that injury of the vehicle occupant due to particles and hot gases is avoided. In this embodiment of the gas bag the envelope part 16 and the two end parts 20, 22 may be fabricated of the same textile material. When using the material according to fabric specimen 1 (FIG. 1a) any orientation of the warp and weft threads in the end parts 20, 22 is allowed. Due to the tension ratio of approx. 1 to 1, the resulting gas permeability is in the range of approx. 5 to 60 l/dm$^2$·min for a tensile force in the range of roughly 5 to 20 kN/m. In the envelope part 16 the tension ratio between warp and weft must amount to 1 to 2. For this ratio a gas permeability in the range of roughly 3 to 20 l/dm$^2$·min is to be obtained from the graph for the stated tensile stress range. So that the tension ratio in the direction of the warp threads in relation to the tension in the direction of the weft threads amounts to approx. 1 to 2, the weft threads in the envelope part must be oriented in the circumferential direction and the warp threads in the axial direction thereof.

When a textile fabric is selected for the envelope part 16, the gas permeability of which for a tension ratio of 2 to 1 between warp and weft is less than for a tension ratio of 1 to 2, the warp threads must be oriented in the circumferential direction and the weft threads in the axial direction.

Figure 4:
FIG. 4 is a double-exposure interferogram to illustrate the tension conditions in the envelope of an inflated gas bag.

In simple geometrical shapes of the gas bag the tension distribution in the parts of its envelope are easy to define due to geometrical considerations. For more complex shapes it is of advantage to visualize the tension distribution by an optical imaging system, in particular by means of an holographic, Moiré or Speckle system. FIG. 4 shows a double-exposure interferogram of the surface of an inflated gas bag, the line pattern of which permits an indication of the tension distribution.

Figure 5:
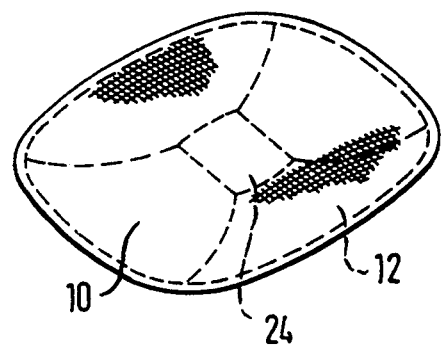
FIG. 5 is a schematic perspective view of a gas bag inflated to be more or less cushion-shaped.

The embodiment of a gas bag as shown schematically in FIG. 5 has in general the shape of a cushion when inflated. Similar to the one according to FIGS. 2a and 2b this gas bag comprises an upper part 10 and a lower part 12 stitched to the outer edge of said upper part. In the middle of the lower part 12 a rectangular opening 24 for connecting a gas generator is provided. In a first approximation it can be assumed that the tension distribution in the upper part 10 is the same as in the lower part 12. In both the upper part 10 and in the lower part 12 the warp threads are oriented in the longitudinal direction of the cushion shape and the weft threads in the transverse direction thereof; due to the more or less uniform tension distribution the orientation can be any, however. The tension ratio between the warp threads and the weft threads is in each case roughly 1 to 1. For the upper part, which is required to have a lesser gas permeability than that of the lower part, a textile material according to that of the first fabric specimen (FIG. 1a) is selected; for the lower part 12 a textile material according to that of the second fabric specimen is chosen (FIG. 1b). The ratios bear a rough comparison to those of the embodiment according to FIGS. 2a and 2b.

Figure 6A:
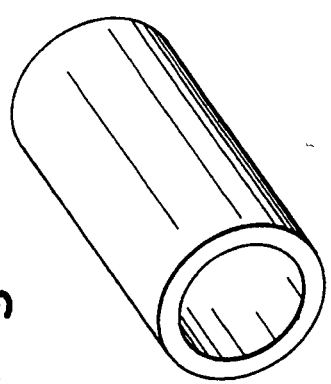
FIGS. 6a and 6b are schematic perspective views of a hollow fiber in the unloaded and loaded conditions.
Figure 6B:
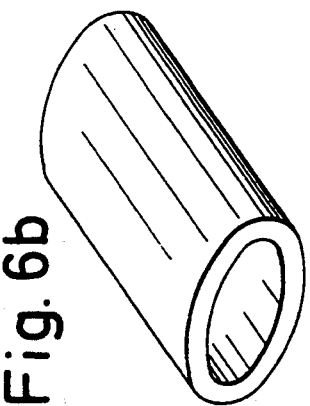

By employing a special type of fiber, namely a hollow fiber, the behaviour of the fabric as regards its gas permeability can be controlled to a high degree. FIG. 6a is a schematic view of such a hollow fiber, shown greatly magnified and in the unloaded condition. FIG. 6b shows the same hollow fiber, but in the loaded condition, in which it is flattened and, therefore, spread.

Figure 7A:
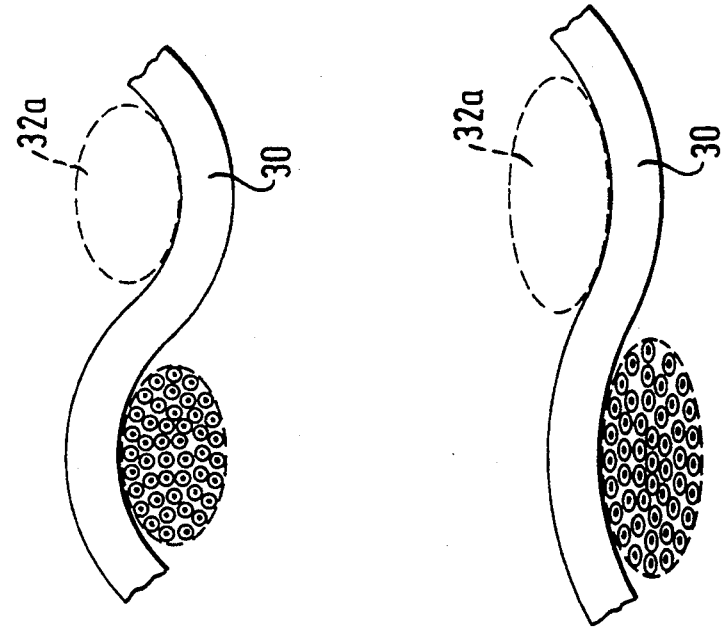
FIGS. 7a and 7b are schematic section views of a textile fabric to illustrate the deformation of a filament yarn made up of hollow fibers, under the influence of pressure as compared to a textile fabric of solid material fibers.
Figure 7B:
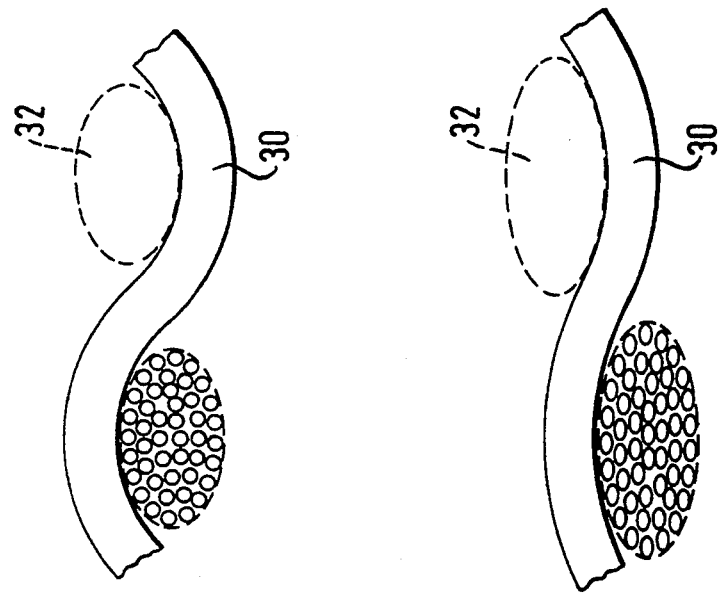

The effects of using such a fiber are illustrated in the FIGS. 7a and 7b. In FIG. 7a it is assumed that the warp threads 30 and the weft threads 32 comprise the usual filament yarn made up of round-section solid fibers. Assuming that the warp threads have a higher crimp than the weft threads 32 and are also subject to a higher tensile stress, the design expansion in the warp direction is higher, due to the crimp being stretched out of the warp threads 30 before the material expansion of the thread occurs. The increased crimp in the weft direction counteracts a material expansion of the warp threads 32, this increased crimp being caused by the higher tensile load in the warp direction. Due to the strong crimp of the warp threads 30 the weft threads 32 receive side support and are thus flattened, i.e. spread, to a lesser degree. On the other hand, this spreading of the threads results in a reduction of the cross-sectional area available for the passage of the gas.

In FIG. 7b it is assumed that at least the weft threads 32a comprise a filament yarn made up of the hollow fibers shown symbolically in FIGS. 6a and 6b. These hollow fibers have a greater tendency to flatten and thus to spread under load than the solid fibers presupposed in FIG. 7a. Under conditions which are otherwise the same a greater spread of the weft threads 32a thus occurs. Controlling the gas permeability of the fabric by the crimp is thus more strongly pronounced than in FIG. 7a.

Figure 8A:
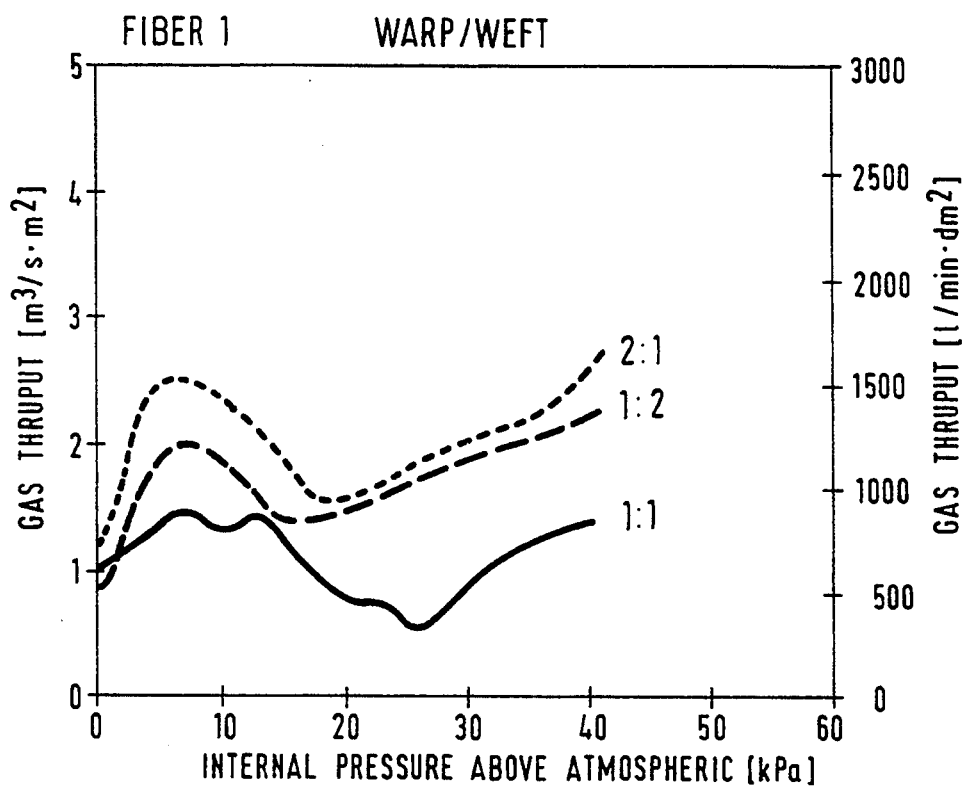
FIGS. 8a and 8b are graphs showing the gas permeability values of two fabrics as a function of the difference in pressure for differing tension conditions and under dynamic conditions.
Figure 8B:
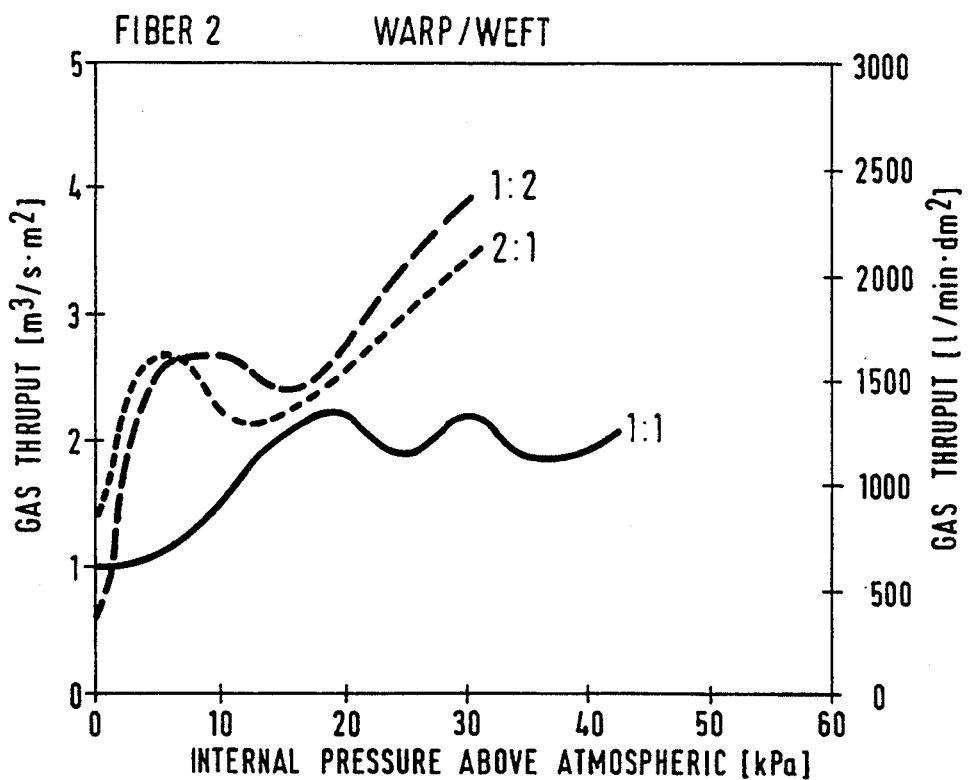

FIGS. 8a and 8b show the gas permeability values for two kinds of fabric, designated "fabric 1" and "fabric 2" as regards the differing conditions of the tension in the direction of the warp threads relative to the tension in the direction of the weft threads as a function of the above-atmospheric pressure existing internally. During the activation of a gas bag the following phases can be distinguished:

a) an initial phase where after activation of the gas generator the envelope of the gas bag is unfolded and filled with gas until it is completely expanded;
p1 b) a main phase where after completed inflation of the envelope the vehicle occupant's head and torso penetrate into the envelope;
c) a final phase where the gas escapes from the envelope.

With usual gas generators, the initial phase is accomplished within about 20 to 60 ms. The development of the main phase is determined by numerous parameters and, in particular, the crash conditions, the type of vehicle as well as size and weight of the vehicle occupant. The internal pressure of the bag continuously evolves during the entire sequence. In the initial phase the internal pressure rises to a value of e.g. 10 to 20 kPa above atmospheric. In the succeeding main phase, the internal pressure can be substantially increased by the occupant penetrating into the bag, e.g. up to a value of 40 kPa or more. The final phase is interesting for the present considerations only in as far as an extended duration of this phase provides a prolonged protection. In the initial and main phases the gas permeability of the bag as a function of internal gas pressure is of major importance. This function is depicted in FIG. 8a and 8b wherein the abscissa shows the internal pressure values and should not be confounded with a time scale. Exposure to pressure is made with a pressure pulse which is profiled to conform to the conditions prevailing on activation of a gas bag restraining system since it was shown that the gas permeability values under dynamic conditions are significantly different from those determined under static conditions, i.e. a fixed pressure difference of 500 Pa. FIGS. 8a and 8b thus demonstrate the dynamic behaviour of the fabric as regards its internal pressure dependent gas permeability for differing conditions of tension as dictated by the geometry of the gas bag in its inflated condition.

Both graphs illustrate the gas thruput through the fabric material with increasing pressure, i.e. during the initial and main phases. In the final phase where the internal pressure decreases, the gas thruput is substantially lower, whereby the duration of effective protection is increased.

In the case of fabric 1 and for a ratio of 1:1 the gas thruput increases only a little with increasing internal pressure above atmospheric and remains below a value of 1,000 l/dm$^2$·min. When this internal pressure is 20 kPa at which the vehicle occupant is or is anticipated to be cushioned by the gas bag the gas thruput is just a little more than 500 l/dm$^2$·min, in other words, the fabric is nearly impermeable to the gas. Gas permeability for an internal pressure of 20 kPa above atmospheric under tensional conditions of 2 to 1 and 1 to 2 is also so low that the fabric can practically be termed impermeable to the gas. Particularly remarkable in this respect is the pronounced drop in the gas thruput for an internal pressure of more than 10 kPa above atmospheric. Fabric 1 is thus suitable for those parts of the gas bag which face the vehicle occupant and which are required to exhibit a low gas permeability. It is preferably used in a 1:1 orientation.

Contrary to fabric 1, fabric 2 exhibits an over-proportional increase in gas permeability in the region of up to approx. 20 kPa with increasing internal pressure above atmospheric, this effect being particularly pronounced between 10 and 20 Pa for a 1 to 1 tension ratio and between 0 and 10 kPa for tension ratios of 1 to 2 and 2 to 1. Fabric 2 thus "opens" so-to-speak with increasing internal pressure above atmospheric, whilst fabric 1 tends to "close" with increasing internal pressure above atmospheric. Fabric 2 is thus suitable for those parts of the gas bag facing away from the vehicle occupant and which are required to exhibit a higher gas permeability.

For a balloon-shaped gas bag composed of two circular parts of fabric, as illustrated in FIGS. 2a and 2b, the upper part facing the vehicle occupant is fabricated from fabric 1 and the lower part from fabric 2. In both parts of the fabric the distribution of the tension is symmetrical due to the geometry of the gas bag.

For a generally cylindrically shaped gas bag as shown in FIG. 3 the envelope part is fabricated for a tension ratio of 1 to 2 or 2 to 1 from fabric 1 and for the side parts fabric 2 is employed.

When the gas bag is cushion-shaped as shown in FIG. 5 the upper part facing the occupant is fabricated from fabric 1 for the tension ratio 1 to 2 or 2 to 1 whilst for the lower part fabric 2 is used.

FIG. 8c shows a graph depicting total gas thruput through the envelope of a gas bag as a function of its internal pressure above atmospheric. For an ideal gas bag the gas permeability curve lies between an upper curve $G_{max}$ and a lower curve $G_{min}$ in FIG. 8c. These two curves form a corridor in which the gas permeability curve of an ideal gas bag should lie. The curves shown in FIG. 8c are to be interpreted as follows: when the gas bag unfolds a pressure builds up within, which is above atmospheric and which rapidly increases, it already resulting in the gas bag being fully unfolded within a few milliseconds. This so-called charging time depends on the size of the gas bag and amounts to between approx. 20 and approx. 35 ms. The internal pressure above atmospheric of the gas bag reaches a maximum when the vehicle occupant impacts the gas bag. The effective hardness of the gas bag is dictated by the gas permeability of its envelope as a function of the internal pressure above atmospheric in each case. In the initial phase of this internal pressure being built up the gas bag should be soft to minimize the risk of injury in the case of light impact. When high values of this internal pressure above atmospheric occur, the impact is hard, for instance in the case of the vehicle occupant not wearing a seat belt. So that the occupant would not hit through the bag the latter must be hard. By means of the profile of the gas permeability values shown in FIG. 8c as a function of the bag internal pressure above atmospheric this wanted, self-regulating response of the gas bag is achieved. For the optimum profile of the gas permeability curve between the curves $G_{max}$ and $G_{min}$ several parameters—particularly vehicle type, gas generator, size and shape of the gas bag and the existing temperature—are the determining factors.

It has now been found out that the ideal gas permeability curve of the gas bag as a whole can be achieved with a gas bag envelope fabricated of an uncoated textile fabric which is surprising from the point of view of prior art. In prior art the suitability of a fabric for a gas bag is determined by its gas permeability which is statically determined for a fixed predefined differential pressure of 500 Pa. It is thus anticipated that the gas thruput through the fabric is a linear function of this difference in pressure. A gas permeability increasing linearly with pressure would have to be depicted in the graph shown in FIG. 8c by a straight line passing through zero, whereas the ideal gas permeability curve running between the curves $G_{max}$ and $G_{min}$ in FIG. 8c can be defined as follows:

a) up to a pressure of roughly 10 kPa above atmospheric the gas permeability increases with increasing pressure to a value between roughly 0.5 and approx. 1.0 m$^3$/s;

b) between values of approx. 10 kPa and approx. 20 kPa of this pressure above atmospheric the gas permeability increases further to a maximum value, before decreasing;

c) at more than a pressure of approx. 20 kPa above atmospheric in a range to at least approx. 40 kPa there is no significant increase in the gas permeability.

At more than a pressure of 20 kPa above atmospheric and in a range of at least approx. 40 kPa there is preferably a tendency for the gas permeability to decrease. It will be seen also that the gas permeability curve preferably passes through a point of inflection at pressure values of more than approx. 20 kPa above atmospheric. Finally, it will be seen that the gas permeability increases preferably stronger than linearly up to a pressure of 10 kPa above atmospheric.

An uncoated textile fabric exhibiting the required gas permeability can be defined by carefully selecting the conventional weave parameters. It is essential, however, that the gas permeability of a fabric is determined dynamically and the tension conditions existing in the gas bag when inflated are taken into account. Since the proceedings of expansion and compression of the gas bag are concluded within a time span of approx. 100 ms to 150 ms, determining the gas permeability of a fabric experimentally must be done with a pressure pulse which achieves the resulting values of the internal pressure above atmospheric within a comparable time span.

Since the gas bag has a low gas permeability preferably in its region facing the vehicle occupant the profile of the gas permeability curve resulting from FIG. 8c must be achieved mainly by the fabric in the other regions of the gas bag. When the gas bag is composed of differing sections of fabric, those facing the vehicle occupant are required to exhibit a lesser gas permeability than those facing away from the occupant. The gas permeability curve as shown in FIG. 8c is then the sum of the two gas permeability curves of the fabric sections employed. The fabric section facing the vehicle occupant is preferably "gas-tight", i.e. its gas permeability increases at most unsubstantially when subjected to one-sided pressure for a duration of approx. 100 ms at least above a value of approx. 10 kPa and up to a value of at least approx. 40 kPa of internal pressure; preferably it should even decrease significantly. Under these conditions an uncoated fabric may be employed, the gas permeability of which amounts to more than 12 l/dm$^2$·min, e.g. 15–18 l/dm$^2$·min for a static pressure application having a difference in pressure of 500 PA.

To achieve the desired profile of the gas permeability curve with a conventional uncoated textile fabric of polyamide (PA) or polyester (PES) fibers the following parameters are carefully selected: thread density (set), thread type (polymerisate and shrinkage behaviour), weave, crimp and finishing. An appropriate conventional textile fabric of polyamide fibers with a hot air shrinkage of approx. 5% has a thread density of 350 dtex. To significantly simplify fabrication of the gas bag when made up of differing fabric sections the same type of fabric as determined by its set and type of thread is always employed, despite the completely differing behaviour of the various sections of the fabric.

I claim:

1. A gas bag for a vehicle occupant restraining system having an envelope of uncoated textile fabric comprising at least one zone facing a vehicle occupant in an inflated condition and at least one zone facing away from said occupant, wherein said envelope both in said zone facing said vehicle occupant and in said zone facing away from said occupant is made from the same type of textile fabric as determined by thread density and filament yarn, said fabric having predetermined directions of warp and weft threads in each of said zones and said fabric having gas permeability values in said zones which are substantially different from each other and are determined by the ratio of tension in the direction of the warp threads relative to the tension in the direction of the weft threads as dictated by the geometry of the inflated gas bag.

2. The gas bag of claim 1, wherein said envelope is generally balloon-shaped or cushion-shaped in its inflated condition and comprises two fabric sections one of which faces the vehicle occupant, the other facing away from the occupant, and wherein depending on relative pressure within the envelope during expansion and subsequent compression as well as for an average ratio of 1 to 1 between the tension in the direction of the warp threads and the tension in the direction of the weft threads:

a) the gas permeability of the fabric section facing away from said vehicle occupant increases to a maximum value of more than 2 m$^3$/s·m$^2$ with an increase of internal pressure to a value not substantially exceeding a value of 20 kPa above atmospheric and does not significantly increase up to a pressure of approx. 40 kPa above atmospheric; and b) the gas permeability of the fabric section facing said vehicle occupant increases to not more than approx. 1,5 m$^3$/s·m$^2$ at least up to a value of approx. 40 kPa of pressure above atmospheric.

3. The gas bag of claim 2, wherein the gas permeability of the fabric section facing away from the vehicle occupant significantly decreases after having reached a maximum value in a range between approx. 10 and approx. 20 kPa of internal pressure above atmospheric.

4. The gas bag of claim 1, wherein said envelope comprises a first fabric section which is generally cylindrically shaped in the inflated condition of said envelope and two side fabric sections, wherein depending on relative pressure within the envelope during expansion and subsequent compression:

a) the gas permeability of said side fabric sections for an average ratio of 1 to 1 between the tension in the direction of the warp threads and the tension in the direction of the weft threads increases to a maximum value of more than 2 m$^3$/s·m$^2$ with an increase of internal pressure to a value not substantially exceeding 20 kPa above atmospheric and does not significantly increase up to a pressure of approx. 40 kPa above atmospheric; and b) the gas permeability of said first fabric section for an average ratio of 2:1 or 1:2 between the tension in the direction of the warp threads and the tension in the direction of the weft threads increases to not more than approx. 1.5 m$^3$/s·m$^2$ at least up to a value of approx. 40 kPa of internal pressure above atmospheric.

5. The gas bag of claim 4, wherein the gas permeability of said side fabric sections significantly decreases after having reached a maximum value in a range between approx. 10 and approx. 20 kPa of internal pressure above atmospheric.

6. The gas bag of claim 1, wherein at least part of the filament yarn used for its manufacture is made up of hollow fibers.

7. An uncoated textile fabric for use in an envelope of a gas bag of a vehicle occupant restraining system, said envelope exhibiting a lower gas permeability in zones facing the vehicle occupant than in zones facing away from said occupant, said fabric having a gas permeability which increases to a value of not more than approx. 1.5 m$^3$/s·m$^2$ when subjected to one-sided pressure for a duration of approx. 150 ms up to a value of approx. 40 kPa of internal pressure above atmospheric.

8. The fabric of claim 7 which has a gas permeability which amounts to more than 12 l/dm$^2$·min for a static one-sided pressure exposure at a pressure difference of 500 Pa.

9. An uncoated textile fabric for use in an envelope of a gas bag of a vehicle occupant restraining system, said envelope exhibiting a lower gas permeability in zones facing the vehicle occupant than in zones facing away from said occupant, said fabric having a gas permeability which increases to a maximum of more than 2 m$^3$/s·m$^2$ when subjected to one-sided pressure for a duration of approx. 150 ms up to a value of not more than approx. 20 kPa, significantly decreases beyond said maximum and thereafter does not significantly increase up to an internal pressure of 40 kPa above atmospheric.

10. The fabric of claim 9, wherein at least part of the filament yarn used for its manufacture is made up of hollow fibers.

* * * * *